(12) United States Patent
Firdaus

(10) Patent No.: US 6,494,027 B1
(45) Date of Patent: Dec. 17, 2002

(54) EFFICIENCY IMPELLER ASSEMBLY FOR YARD VACUUM UNIT

(75) Inventor: Usman Firdaus, Strongsville, OH (US)

(73) Assignee: MTD Products Inc, Cleveland, OH (US)

( * ) Notice: Subject to any disclaimer, the term of this patent is extended or adjusted under 35 U.S.C. 154(b) by 0 days.

(21) Appl. No.: 09/588,979

(22) Filed: Jun. 7, 2000

(51) Int. Cl.[7] .................. A01D 34/03; A01D 34/43; A01D 34/64
(52) U.S. Cl. ........................... 56/16.7; 241/73
(58) Field of Search ................ 241/190, 101.78, 241/101.71, 55, 41, 51, 49, 73; 56/16.7

(56) References Cited

U.S. PATENT DOCUMENTS

| | | | | |
|---|---|---|---|---|
| 1,759,905 A | * | 5/1930 | Keith | 241/49 |
| 2,418,990 A | * | 4/1947 | Sheldon | 241/51 |
| 3,260,468 A | * | 7/1966 | Beard | 241/43 |
| 3,410,495 A | * | 11/1968 | Eklund | 241/278.1 |
| 5,018,672 A | * | 5/1991 | Peck et al. | 241/37.5 |
| 5,240,189 A | | 8/1993 | Majkrzak et al. | |
| 5,240,190 A | | 8/1993 | Johnson | |
| 5,358,189 A | | 10/1994 | Vandermolen | |
| 5,390,865 A | * | 2/1995 | Vandermolen et al. | 241/101.7 |
| 5,605,291 A | | 2/1997 | Doskocil | |
| 5,669,563 A | * | 9/1997 | Gearing et al. | 241/101.78 |
| 5,799,365 A | | 9/1998 | Firdaus | |
| 5,931,396 A | | 8/1999 | Firdaus | |

FOREIGN PATENT DOCUMENTS

| | | |
|---|---|---|
| GB | 2261616 | 5/1993 |
| WO | WO9809503 | 3/1998 |

* cited by examiner

Primary Examiner—Robert E. Pezzuto
Assistant Examiner—Árpád Fábián Kovács
(74) Attorney, Agent, or Firm—Emerson & Skeriotis; Roger D. Emerson; Timothy D. Bennett

(57) ABSTRACT

A yard vacuum unit includes a deck including upper and lower housing members that form a discharge outlet and a nozzle operatively connected to the deck. An engine is, mounted to the deck and includes a drive shaft. An impeller assembly is used to draw yard debris in through the nozzle and out through the discharge outlet and is positioned between the upper and lower housing members. The impeller assembly includes an impeller plate, a hub fixedly connected to the impeller plate, and a plurality of fan blades each having first and second ends and first and second sides. Each fan blade first end is fixedly connected to the hub all along the first end and each fan blade first side is fixedly connected to the impeller plate all along the first side. In this way, a continuous airtight seal is formed along the entire first end of each fan blade with the hub and along the entire first side with the impeller plate. Each second end extends to the outer periphery of the impeller plate.

6 Claims, 4 Drawing Sheets

EFFICIENCY IMPELLER ASSEMBLY FOR YARD VACUUM UNIT

BACKGROUND OF THE INVENTION

1. Field of Invention

This invention pertains to the art of methods and apparatuses for yard vacuum units, and more specifically to methods and apparatuses for an efficient impeller assembly used in a yard vacuum unit.

2. Description of the Related Art

Yard vacuum units are used to create a vacuum whereby yard debris, such as sticks, leaves, grass clippings and other such foliage, can be collected. Typically, the vacuum unit draws the debris into a nozzle and then deposits the debris into a debris collecting bag where the debris can then be disposed of. It is well known in the field of such vacuum units to provide impeller assemblies that are used to create the vacuum power. Known impeller assemblies are generally well suited for their intended purpose. However, known impeller assembly efficiencies are relatively low.

Applicants have discovered an impeller assembly that provides substantially greater vacuum efficiency than is currently known in the art. The difficulties inherit in the art are therefore overcome in a way that is simple and efficient, while providing better and more advantageous results.

SUMMARY OF THE INVENTION

According to one aspect of the present invention, a yard vacuum unit includes a deck including upper and lower housing members that form a discharge outlet, a plurality of ground engaging wheels operatively connected to the deck, and a nozzle operatively connected to the deck. An engine is mounted to the deck and includes a drive shaft. An impeller assembly is used to draw yard debris in through the nozzle and out through the discharge outlet and is positioned between the upper and lower housing members. The impeller assembly includes an impeller plate having an outer periphery and first and second surfaces, a hub fixedly connected to the impeller plate, and a plurality of fan blades each having first and second ends and first and second sides. The hub includes a hole that that operatively receives the drive shaft. Each fan blade first end is fixedly connected to the hub all along the first end and each fan blade first side is fixedly connected to the impeller plate all along the first side. In this way, a continuous airtight seal is formed along the entire first end of each fan blade with the hub and along the entire first side with the impeller plate. Each second end extends to the outer periphery of the impeller plate.

According to another aspect of this invention, each of the first sides of the fan blades and the impeller plate form first and second intersection surfaces each having a radius R1 that is at least 0.25 inches. Similarly, each of the first ends of adjacent fan blades and the hub form a connection surface having a radius R2 that is at least 0.50 inches.

According to still another aspect of this invention, the impeller plate, said hub and said plurality of fan blades are formed in a one piece cast. Preferably this cast is formed of Aluminum.

One advantage of this invention is that vacuum unit efficiency is increased about 30% over known impeller assemblies.

Another advantage of this invention is that it is easy and inexpensive to manufacture and use.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part hereof and wherein.

DESCRIPTION OF THE PREFERRED EMBODIMENT

Figure 1:
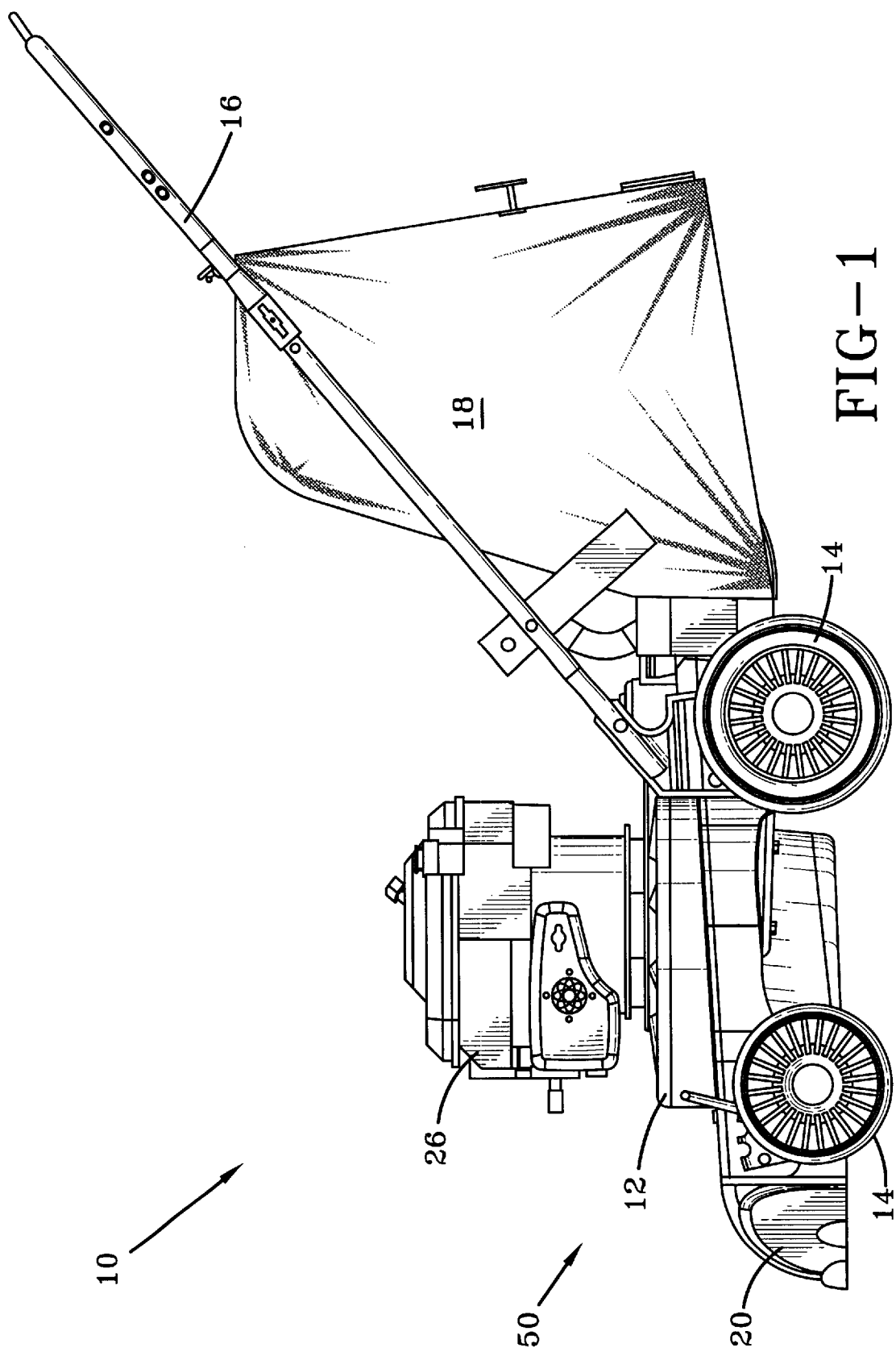
FIG. 1 is an elevation view of a vacuum unit equipped with the impeller assembly of this invention.
Figure 2:
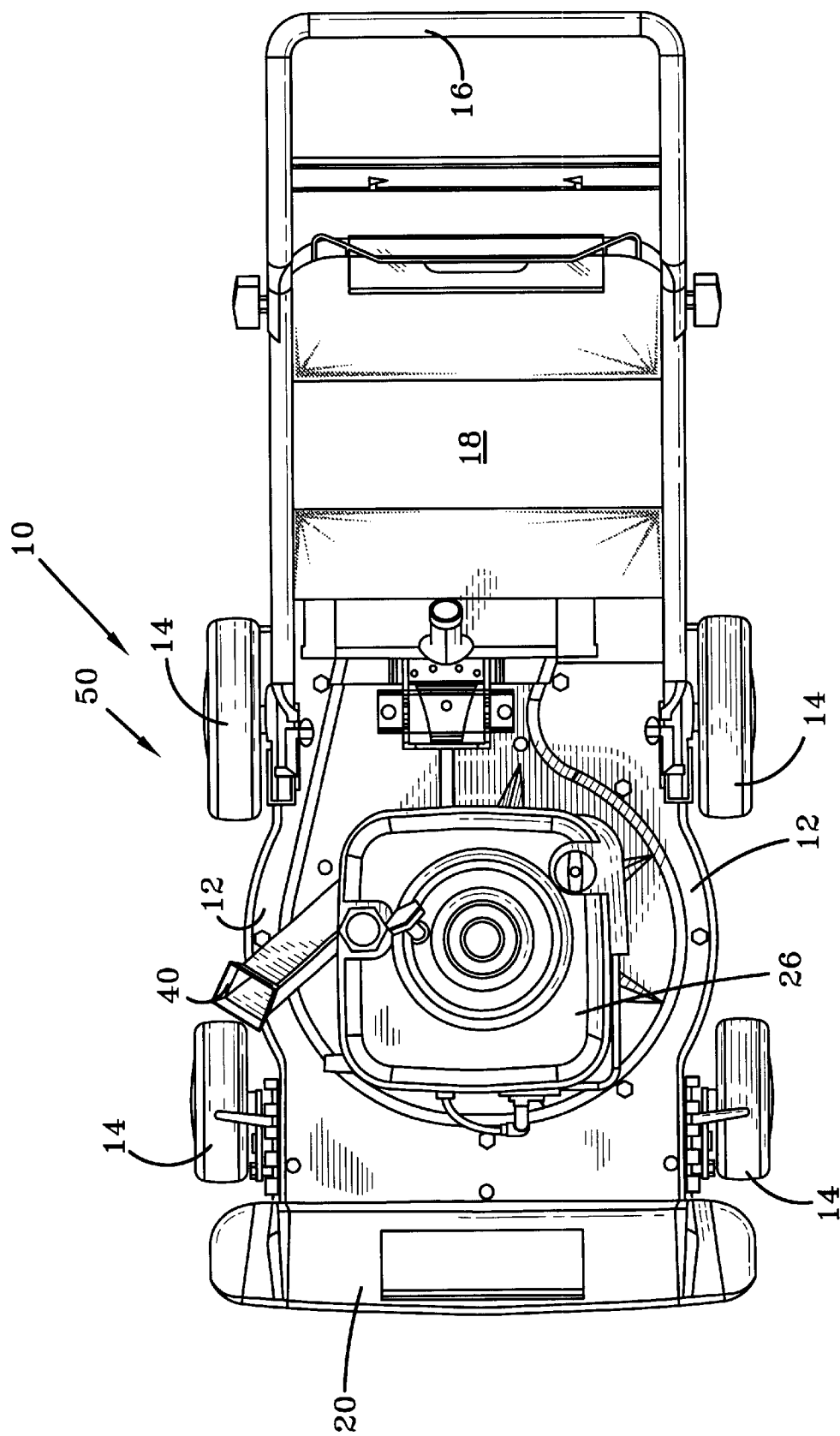
FIG. 2 is a plan view of the vacuum unit of FIG. 1 showing the chipper chute.

Referring now to the drawings wherein the showings are for purposes of illustrating a preferred embodiment of the invention only and not for purposes of limiting the same, FIGS. 1 and 2 shows a vacuum unit 10 equipped with the present invention, an impeller assembly 50. Throughout this disclosure the inventive impeller assembly is described with reference to a walk-behind yard vacuum unit but the invention is also applicable to other vacuum units and other applications as well. The vacuum unit 10 includes a body or deck 12 supporting a plurality of ground engaging wheels 14 whereby the vacuum unit 10 can be easily transported. Preferably, a vacuum unit handle 16 extends from the deck 12 whereby an operator can provide the required force to move the vacuum unit 10 to the location desired. A collection bag 18 may be supported from the handle 16 and is used to collect debris (not shown) vacuumed by the vacuum unit 10.

Figure 3:
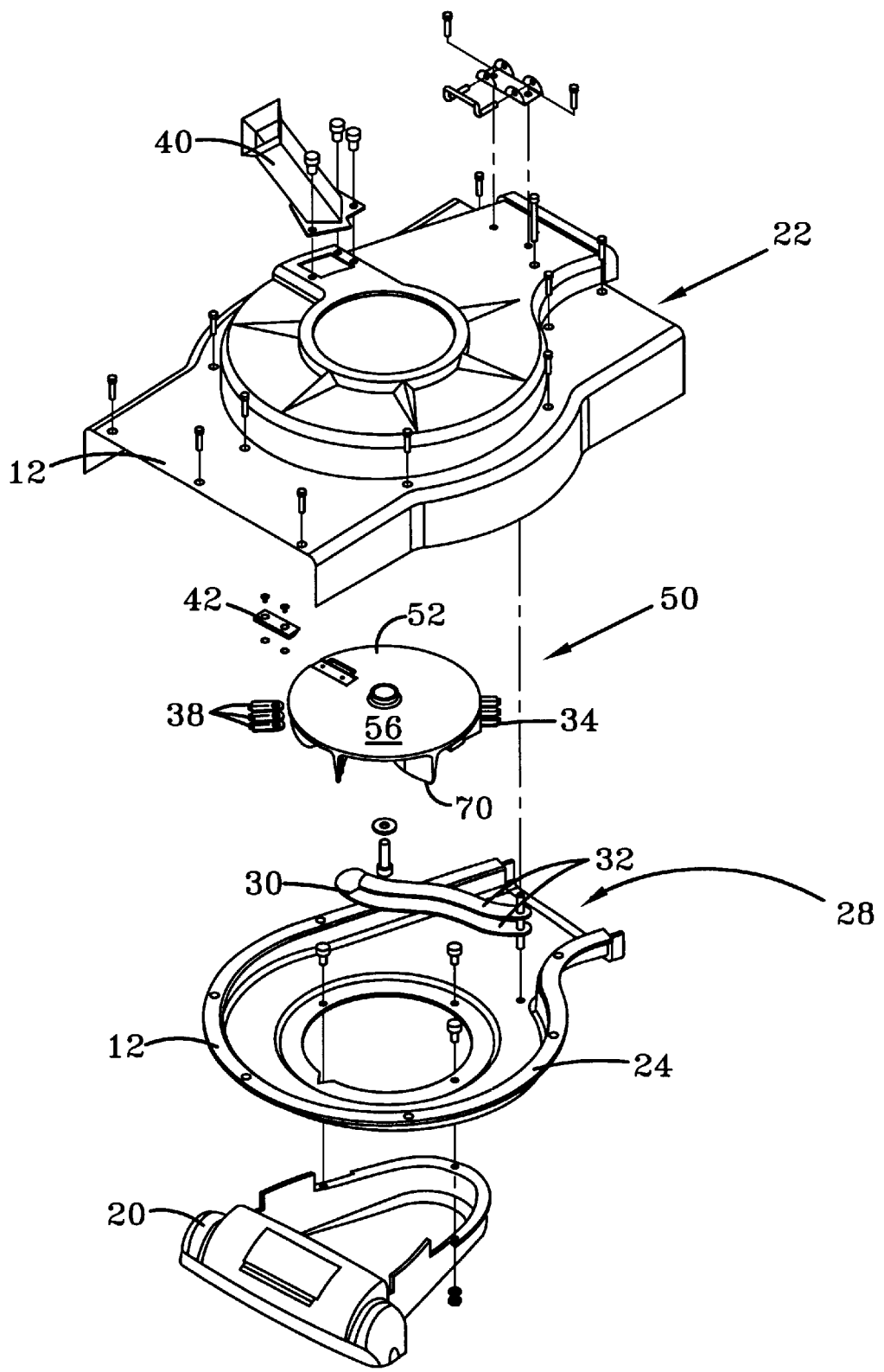
FIG. 3 is an assembly drawing showing the upper and lower housing members, the nozzle, the screen, and the impeller assembly.

With reference now to FIGS. 1–3, a nozzle 20 is provided at the front of the deck 12 and forms a chute whereby the debris is transported from the ground. Preferably, the deck 12 includes upper and lower housing members 22, 24 as seen in FIG. 3. The housing members 22, 24 together form a discharge outlet 28. The impeller assembly 50 is preferably positioned between the upper and lower housing members 22, 24. A screen 30 (preferably having a plurality of screen blades 32) may be provided to assist in shredding the debris prior to its entry into the bag 18. Preferably, the screen 30 is positioned just downstream of the impeller assembly 50 but upstream of the discharge outlet 28 as shown. An engine 26 is mounted to the deck 12 and includes a drive shaft (not shown but well known in the art) that is used to rotate the impeller assembly 50. As the impeller assembly 50 is rotated, a sufficient suction or vacuum pressure is created to enable the vacuum unit 10 to transport debris from the nozzle 20, through the screen 30 and discharge outlet 28, and into the bag 18.

With reference now to FIGS. 3–6, the impeller assembly 50 includes an impeller plate 52 having first and second surfaces 54, 56. The impeller plate 52 has a generally circular cross-section and an outer periphery 58. A hub 60 is fixedly connected to (and is preferably concentric with) the impeller plate 52. The hub 60 is generally cylindrical in shape and has an outer surface 62. The hub 60 also has connecting means 64 that operatively connects the engine 26 to the impeller assembly 50 whereby the impeller assembly 50 can be rotated. Although the connecting means 64 may be of any type chosen with sound engineering judgement, preferably it includes a hole 66 that operatively receives the engine drive shaft. The impeller assembly 50 also includes a plurality of fan blades 70 that create a vacuum when the impeller assembly 50 is rotated. Although six fan blades 70 are shown, the precise number of fan blades may vary depending on the specific requirement. Each fan blade 70 has first and second ends 68, 72 and first and second sides 74, 76.

It should be noted that the impeller assembly components discussed so far are known in the art. What is unknown, however, is the next to be discussed inventive improvements that applicant has discovered greatly increase the efficiency (vacuum pressure created per engine horsepower exerted) of an otherwise seemingly similar impeller assembly. Testing has revealed that the impeller assembly 50 of this invention provides a 30% efficiency increase over known impeller assemblies. The parameters that follow are believed to provide this unexpected result.

With continuing reference to FIGS. 3–6, each fan blade 70 has a width W that varies along the length of the fan blade 70. Preferably the width W is smallest at the first end 68 and either remains constant or increases toward the second end 72 of the fan blade 70. Importantly, the second side 76 is either substantially parallel to the first surface 54 of the impeller plate 52 or has gradual (large radius) transitions where the width W varies. This shape is believed to contribute significantly to the improved efficiency.

Figure 4:
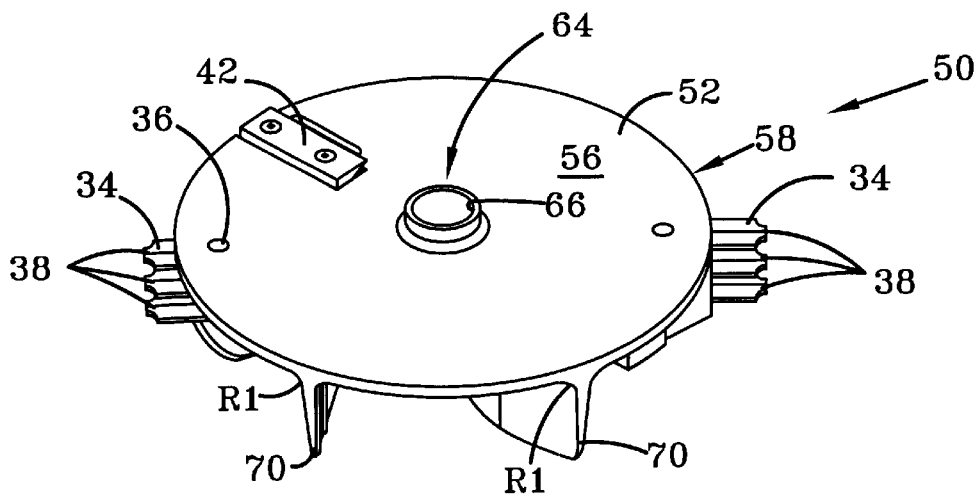
FIG. 4 is a top perspective view of the impeller assembly showing the flails and the chipper knife.
Figure 5:
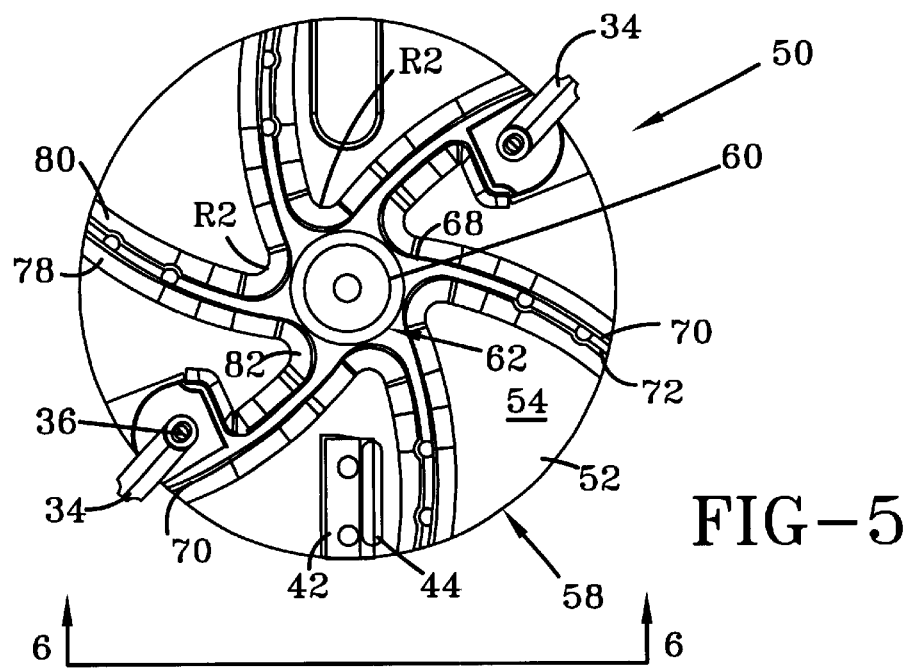
FIG. 5 is a bottom view of the impeller assembly of FIG. 4 showing the fan blades connected to the hub and the impeller plate.
Figure 6:
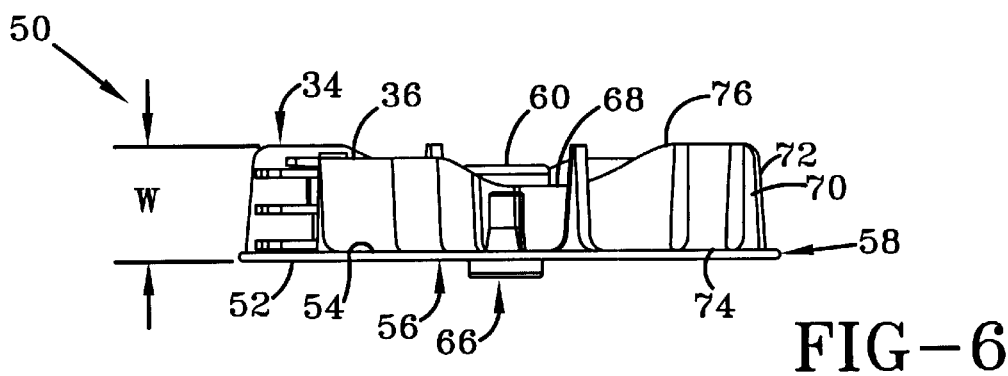
FIG. 6 is an elevation view of the impeller assembly taken along line 6—6 of FIG. 5 showing the width W of the fan blades.

Referring now to FIGS. 4–6, the first end 68 of each fan blade 70 is fixedly connected to the outer surface 62 of the hub 60 all along the first end 68. By "all along the first end" it is meant that all portions of the first end 68 are connected to the outer surface 62. It should be noted that this connection forms an airtight seal. Similarly, the first side 74 of each fan blade 70 is fixedly connected to the first surface 54 of the impeller plate 52 all along the first side 74. By "all along the first side" it is meant that all portions of the first side 74 are connected to the first surface 54. This connection, also, forms an airtight seal. The second end 72 of each fan blade 70 extends to the outer periphery 58 of the impeller plate 52. Thus, a continuous airtight seal is formed along the entire first end 68 of each fan blade 70 (with the outer surface 62 of the hub 60) and along the entire first side 74 (with the first surface 54 of the impeller plate 52) that extends to the periphery 58 (perimeter) of the impeller plate 52. Most preferably the second end 72 of each fan blade 70 is substantially perpendicular to the periphery 58 of the impeller plate 52.

Still referring to FIGS. 4–6, each of the first sides 74 of the fan blades 70 form first and second intersection surfaces 78, 80 (that create the airtight seal) with the first surface 54 of the impeller plate 52. These intersection surfaces 78, 80 extend the length of the fan blades 70 and have a radius R1 that is at least 0.25 inches. Similarly, each of the first ends 68 of adjacent fan blades 70 form a connection surface 82 (that creates the airtight seal) with the outer surface 62 of the hub 60. This connection surface 82 has a radius R2 that is at least 0.50 inches.

These radii (R1 and R2) are believed to be required to maintain the high efficiency of the impeller assembly 50 by creating proper flow channels for the air that is moved to create the vacuum pressure.

With continuing reference to FIGS. 4–6, although the benefits described above can be achieved by forming the impeller assembly 50 by any means chosen with sound engineering judgement (such as by welding the components together), in the preferred embodiment, the impeller assembly 50 (including the impeller plate 52, the hub 60 and the fan blades 70) is formed in a one piece cast. Most preferably, the impeller assembly 50 is formed as a one piece cast aluminum to maintain the required strength and yet reduce the overall weight. This lighter weight is also believed to assist in providing the unexpected efficiency result.

With reference now to FIGS. 2–6, in the preferred embodiment (as shown), the vacuum unit 10 is used not only to vacuum debris but also to shred the debris and to chip harder foliage (such as tree limbs). To accomplish these additional tasks, the impeller assembly 50 may include at least one (preferably two) flail 34 pivotably connected (with a flail rod 36) to the impeller plate 52. These flails 34 are preferably not formed in the one piece cast but are separate and are preferably formed of steel. The flails 34 have a plurality (three shown) of flail teeth 38 and are preferably mounted to the impeller plate 52 adjacent to one of the fan blades 70. It is most preferred that the flail teeth extend beyond the periphery of the impeller plate 52 so that they may be received between the screen blades 32. Thus, the flails 34 serve the purpose of continually "cleaning out" any debris that may have been stuck between the screen blades 32. This constant clean out of the screen 30 is also believed to contribute to the high efficiency of the impeller assembly 50. To provide for a chipping option, the vacuum unit may include a chipper chute 40 that attaches to the upper housing member 22 and permits debris to be chipped (such as tree limbs) to be inserted toward the second surface 56 of the impeller plate 52. At least one chipper knife 42 is then mounted to the second surface 56 adjacent a slot 44 formed through the impeller plate 52. Thus, the associated debris to be chipped contacts the second surface 56, then extends through the slot 44 and is cut by the chipper knife 42 into finer debris that is then propelled toward the screen 30 as is the debris drawn through the nozzle 20.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A yard vacuum unit comprising:

a deck including upper and lower housing members that form a discharge outlet;

a plurality of ground engaging wheels operatively connected to said deck;

a nozzle operatively connected to said deck;

an engine mounted to said deck and including a drive shaft; and, an impeller assembly for use in drawing associated yard debris in through said nozzle and out through said discharge outlet, said impeller assembly being positioned between said upper and lower housing members, said impeller assembly including, A) an impeller plate that is generally planar with a generally circular cross-section, said impeller plate having an outer periphery and first and second surfaces;

B) a hub fixedly connected to said impeller plate, said hub being generally cylindrical in shape with an outer surface, said hub including connecting means that operatively receives said drive shaft; and, C) a plurality of fan blades each having first and second ends and first and second sides, each first end being fixedly connected to said outer surface of said hub all along said first end, each first side being fixedly connected to said first surface of said impeller plate all along said first side, each second end extending to said outer periphery of said impeller plate.

2. The yard vacuum unit of claim 1 wherein each of said first sides of said fan blades and said first surface of said impeller plate form first and second intersection surfaces each having a radius R1 that is at least 0.25 inches, said first and second intersections forming airtight seals between said fan blades and said impeller plate.

3. The yard vacuum unit of claim 2 wherein each of said first ends of adjacent of said fan blades and said hub form a connection surface having a radius R2 that is at least 0.50 inches, said connection surface forming an airtight seal between said fan blades and said hub.

4. The yard vacuum unit of claim 3 wherein said impeller plate, said hub and said plurality of fan blades are formed in a one piece cast.

5. The yard vacuum unit of claim 4 further comprising:

a first chipper knife mounted to said second surface of said impeller plate adjacent a slot formed through said impeller plate; and, a first flail pivotably connected to said impeller plate adjacent to one of said plurality of fan blades.

6. The yard vacuum unit of claim 5 further comprising:

a screen having screen blades operatively connected to said upper and lower housing members upstream of said discharge outlet; and, wherein said first flail has at least one tooth that is operatively received between said screen blades as said impeller assembly is rotated.

* * * * *